(12) United States Patent
Mount et al.

(10) Patent No.: US 11,162,836 B2
(45) Date of Patent: *Nov. 2, 2021

(54) AUTOMATIC CALIBRATION OF ON-VEHICLE WEIGHT SCALES

(71) Applicant: Right Weigh, Inc., Hillsboro, OR (US)

(72) Inventors: Andrew Thorpe Mount, Portland, OR (US); Kristopher Lawrence Hett, Portland, OR (US)

(73) Assignee: Right Weigh, Inc., Hillsboro, OR (US)

( * ) Notice: Subject to any disclaimer, the term of this patent is extended or adjusted under 35 U.S.C. 154(b) by 154 days.

This patent is subject to a terminal disclaimer.

(21) Appl. No.: 16/717,450

(22) Filed: Dec. 17, 2019

(65) Prior Publication Data

US 2020/0124464 A1 Apr. 23, 2020

Related U.S. Application Data

(62) Division of application No. 15/436,549, filed on Feb. 17, 2017, now Pat. No. 10,551,241.

(60) Provisional application No. 62/296,424, filed on Feb. 17, 2016.

(51) Int. Cl.
*G01G 19/12* (2006.01)
*G01G 23/01* (2006.01)

(52) U.S. Cl.
CPC ............ *G01G 19/12* (2013.01); *G01G 23/01* (2013.01)

(58) Field of Classification Search
CPC .................................................... G01G 23/01
See application file for complete search history.

(56) References Cited

U.S. PATENT DOCUMENTS

| | | | | |
|---|---|---|---|---|
| 5,478,974 A | * | 12/1995 | O'Dea | G01G 19/10 177/136 |
| 6,118,083 A | | 9/2000 | Boyovich et al. | |
| 2009/0151421 A1 | * | 6/2009 | Susor | G01G 19/022 73/1.13 |
| 2012/0046908 A1 | | 2/2012 | Campbell et al. | |
| 2015/0019165 A1 | * | 1/2015 | Theuss | G01G 19/12 702/173 |

OTHER PUBLICATIONS

Election-Restriction Requirement prepared by the US Patent and Trademark Office for U.S. Appl. No. 15/436,549, filed Sep. 27, 2018, 11 pages.
Office Action prepared by the US Patent and Trademark Office for U.S. Appl. No. 15/436,549, filed Apr. 25, 2019, 12 pages.

* cited by examiner

*Primary Examiner* — John E Breene
*Assistant Examiner* — Jeffrey C Morgan
(74) *Attorney, Agent, or Firm* — Chernoff Vilhauer LLP (57) ABSTRACT

Systems and methods for calibrating an onboard vehicle scale may include disposing a vehicle upon a reference scale; determining reference weight information corresponding to a weight of at least a portion of the vehicle using the reference scale; automatically and wirelessly communicating the reference weight information to an onboard scale coupled to the vehicle; and automatically calibrating the onboard scale using the reference weight information.

6 Claims, 4 Drawing Sheets

AUTOMATIC CALIBRATION OF ON-VEHICLE WEIGHT SCALES

CROSS-REFERENCES

This application is a divisional of U.S. patent application Ser. No. 15/436,549, filed Feb. 17, 2017, which claims the benefit of U.S. Provisional Patent Application Ser. No. 62/296,424, filed Feb. 17, 2016. The complete disclosures of the above application are hereby incorporated by reference for all purposes. The complete disclosure of the following related application is also hereby incorporated for all purposes: U.S. Patent Application Publication No. 2012/0046908.

FIELD

This disclosure relates to systems and methods for determining the weight of a vehicle. More specifically, the disclosed embodiments relate to calibrating onboard scales for vehicles used, for example, in the shipping industry.

SUMMARY

The present disclosure provides systems, apparatuses, and methods relating to calibration of onboard vehicle scales. In some embodiments, an automatic calibration system for an onboard vehicle weighing system may comprise: a scale coupled to a vehicle, such that the scale travels with the vehicle, the scale configured to determine a sensed weight of a portion of the vehicle; a wireless transceiver onboard the vehicle and in communication with the scale; and an onboard controller in communication with the scale and the wireless transceiver, the controller including a processor, a memory, and a plurality of instructions stored in the memory and executable by the processor to: receive the sensed weight of the portion of the vehicle from the scale; receive reference information from an offboard source via the wireless transceiver, wherein the reference information corresponds to a ground weight of the portion of the vehicle; and automatically calibrate the scale using the reference information, such that the scale is configured to convert the sensed weight to the ground weight.

In some embodiments, a method implemented in a data processing system for calibrating an onboard vehicle scale may comprise: receiving, into a data processing system, a sensed weight of a portion of a vehicle from a first scale; receiving, into the data processing system, reference information from an offboard source via a wireless transceiver, wherein the reference information corresponds to a ground weight of the portion of the vehicle; and automatically calibrating the scale with respect to the reference information, using a processor of the data processing system, such that the scale is configured to convert the sensed weight to the ground weight.

In some embodiments, a method for calibrating an onboard vehicle scale, the method comprising: disposing a vehicle upon a reference scale; determining reference weight information corresponding to a weight of at least a portion of the vehicle using the reference scale; automatically and wirelessly communicating the reference weight information to an onboard scale coupled to the vehicle; and automatically calibrating the onboard scale using the reference weight information.

Features, functions, and advantages may be achieved independently in various embodiments of the present disclosure, or may be combined in yet other embodiments, further details of which can be seen with reference to the following description and drawings.

DESCRIPTION

Definitions

The following definitions apply herein, unless otherwise indicated.

"Substantially" means to be essentially conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including, but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

Terms such as "onboard" and "offboard" (and the like) are intended to be understood in the context of a host vehicle on which systems described herein may be mounted or otherwise attached. For example, "offboard" may indicate a status or location that is not on the vehicle, external the vehicle, and/or a direction that is away from the vehicle.

Overview

Existing calibration systems for onboard vehicle weighing systems, which include one or more onboard weight scales, can be inefficient and prone to transcription errors and other user errors. Calibration systems of the present teachings remedy this shortcoming by automatically communicating reference weight data to the onboard scale(s) and by using that reference data to automatically calibrate the scale(s).

Various embodiments of an automatic scale calibration system, as well as related methods, are described below and illustrated in the associated drawings. Unless otherwise specified, an automatic scale calibration system and/or its various components may contain at least one of the structure, components, functionality, and/or variations described, illustrated, and/or incorporated herein. Furthermore, the process steps, structures, components, functionalities, and/or variations described, illustrated, and/or incorporated herein in connection with the present teachings may be included in other similar systems and alternate embodiments. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

In general, an automatic scale calibration system in accordance with aspects of the present disclosure may include one or more onboard scales coupled to a vehicle or portion of a vehicle, one or more ground-based scales for weighing such a vehicle, and a data exchange system configured to wirelessly and automatically facilitate calibration of the one or more onboard scales. Automatic scale calibration system in accordance with aspects of the present disclosure may be especially suitable for use, for example, with tractor-trailer rigs.

Aspects of the automatic scale calibration system described herein may be embodied as a computer method, computer system, or computer program product. Accordingly, aspects of the automatic scale calibration system may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the automatic scale calibration system may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including electro-magnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including wireless, wireline, optical fiber cable, RF, and/or the like, and/or any suitable combination of these.

Computer program code for carrying out operations for aspects of the automatic scale calibration system may be written in one or any combination of programming languages, including an object-oriented programming language such as Java, Smalltalk, C++, and/or the like, and conventional procedural programming languages, such as C. Mobile apps may be developed using any suitable language, including those previously mentioned, as well as Objective-C, Swift, C #, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the automatic scale calibration system are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block or blocks.

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block or blocks.

Any flowchart and/or block diagram in the drawings is intended to illustrate the architecture, functionality, and/or operation of possible implementations of systems, methods, and computer program products according to aspects of the automatic scale calibration system. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of exemplary automatic scale calibration systems as well as related systems and/or methods. The examples in these sections are intended for illustration and should not be interpreted as limiting the entire scope of the present disclosure. Each section may include one or more distinct examples, and/or contextual or related information, function, and/or structure.

Illustrative Embodiment

Figure 1:
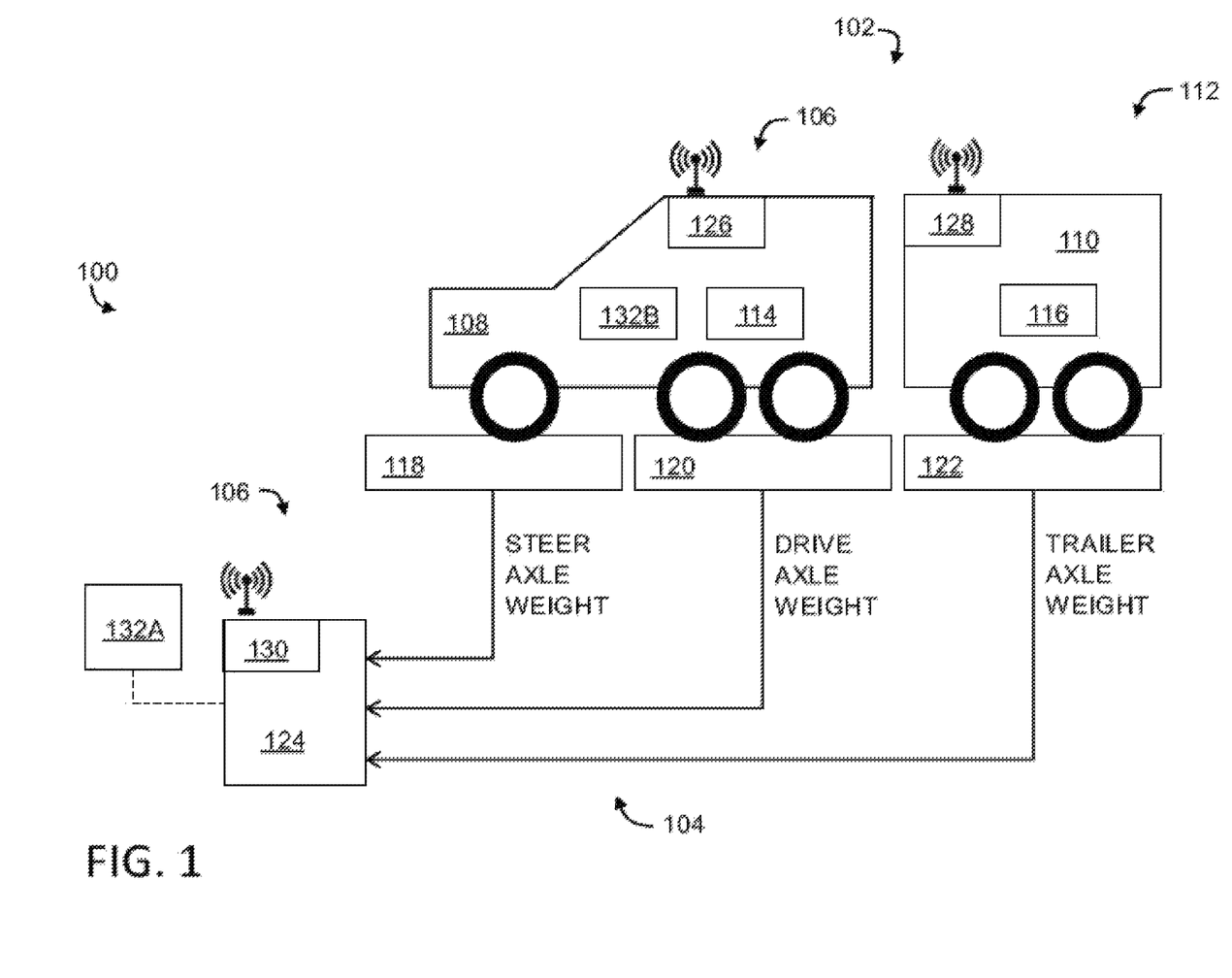
FIG. 1 is a schematic diagram of an illustrative scale calibration system in accordance with aspects of the present disclosure.

As shown in FIG. 1, this section describes an illustrative automatic calibration system 100 for onboard vehicle scales. System 100 is an example of the automatic scale calibration system described generally above.

As depicted in the schematic diagram of FIG. 1, system 100 may include a vehicle 102, an in-ground scale 104 (also referred to as a reference scale and/or a ground-based scale and/or an offboard source of reference weight information), and a data exchange system 106. Vehicle 102 may include any suitable vehicle used to transport cargo over the road, such as a tractor-trailer. For example, as shown in FIG. 1, vehicle 102 may include a tractor portion 108 and a trailer portion 110.

Vehicle 102 includes an onboard vehicle weight monitoring system 112, which may comprise one or more onboard scales 114, 116 installed on the vehicle. Scales 114 and 116 may be digital, having a human-readable display and control circuitry, which may include a data processing system (see below). Each scale may include any suitable electronic device configured to determine a weight of at least an associated portion of the vehicle, based on readings from one or more sensors coupled to or part of the scale. An example of a digital scale suitable for use in system 100 is the E-Z Weigh exterior Bluetooth digital load scale, sold by Right Weigh, Inc., under model number 201-EBT-01B.

Each onboard scale may be associated with a specific portion of the vehicle, such as a certain axle. For example, scale 114 may be operatively connected to the suspension system of one or more axles of tractor portion 108, while scale 116 may be operatively connected to the suspension system of one or more axles of trailer portion 110. Onboard scales may include one or more sensors coupled to the suspension system and/or axle(s) of the vehicle. Such sensors may include load cells, resistance sensors, air pressure sensors, deflection-type sensors, and/or the like, or any combination of these. Suitable examples of sensors and sensing systems are described, for example, in U.S. Patent Application Publication No. 2012/0046908.

In-ground scale 104 may include any suitable device configured to weigh vehicles placed thereon, at a fixed geographical location. In-ground scales are often found at industrial sites, such as gravel pits and landfills, and at state-run compliance sites, such as roadside weigh stations. In-ground scales are typically calibrated independently, and certified or otherwise traceable to governmental standards. In some examples, as depicted in FIG. 1, scale 104 may include multiple portions or pads, such as a forward portion 118, a middle portion 120, and one or more rear portions 122 (also referred to as forward/middle/rear scale pads). Each scale portion may be configured to determine a weight related to a corresponding portion of tractor-trailer 102. For example, forward portion 118 may weigh the steering axle of tractor portion 108, middle portion 120 may weigh the drive axle of tractor portion 108, and rear portion 122 may weigh the axle(s) of trailer portion 110. More or fewer scale portions may be present. Weight-related data may be output from sensors in each portion of the scale.

In-ground scale 104 may include a central controller or data processor 124 configured to receive the weight-related outputs from scale portions 118, 120, 122, and to determine the various weights related to tractor-trailer 102 based on those readings. Controller 124 may be located remotely with respect to the scale pads, such as in a nearby personnel shelter.

Data exchange system 106 includes communication units associated with each of the onboard scales and the in-ground scale, as well as logical algorithms for transferring information and calibrating the onboard scale(s). For example, a first wireless transceiver 126 may be coupled to onboard scale 114, and a second wireless transceiver 128 may be coupled to onboard scale 116. A substantially similar wireless transceiver unit or module 130 may be coupled to in-ground scale 104. Communication to and from transceivers 126, 128, 130 may be wireless, e.g., using a BLUETOOTH® protocol or WiFi networking.

Data exchange system 106 may further include one or more control modules 132A, 132B (also referred to as controllers), which may be present on tractor-trailer 102 and/or in-ground scale 104. Modules 132A and 132B may be disposed completely on the vehicle, completely on the in-ground scale, partially on each, and/or partially on a third networked system (e.g., in the cloud). Collectively, modules 132A and 132B include logical algorithms configured to communicate the weight(s) determined by the in-ground scale to the onboard scale(s). Once received by the onboard scale(s), the weight information from the in-ground scale may be utilized to adjust or calibrate the onboard scales. In other words, the onboard scales may be altered to match or at least correspond to the in-ground scale data. Because communication is electronic and the onboard scales are digital in nature, such a calibration can be carried out automatically, e.g., with the push of a button or initiation of a command. In some examples, one or more aspects of data exchange system 106 may be implemented in mobile electronic devices, such as smart tablets or smart phones.

In some examples, a scale calibration system may include a vehicle equipped with an on-vehicle weight scale that is capable of wireless data transmission, and a reference scale that is also capable of wireless data transmission. The on-vehicle scale will receive reference weight data from the reference scale, and will update the on-vehicle weight calibration data.

In some examples, the reference scale system can request the weight measured by the on-vehicle scale before sending a new reference weight data to the on-vehicle system. The data existing prior to calibration can then be stored locally or transmitted in real-time to a central processing system for use in various maintenance activities.

In some examples, both the reference system and the on-vehicle scale have unique system identification tags. This may allow both systems to track the vehicle or reference system that was used during the calibration process. In these examples, the system identification tag may be retrievable by either system via the wireless data transmission system.

Illustrative Method

Figure 2:
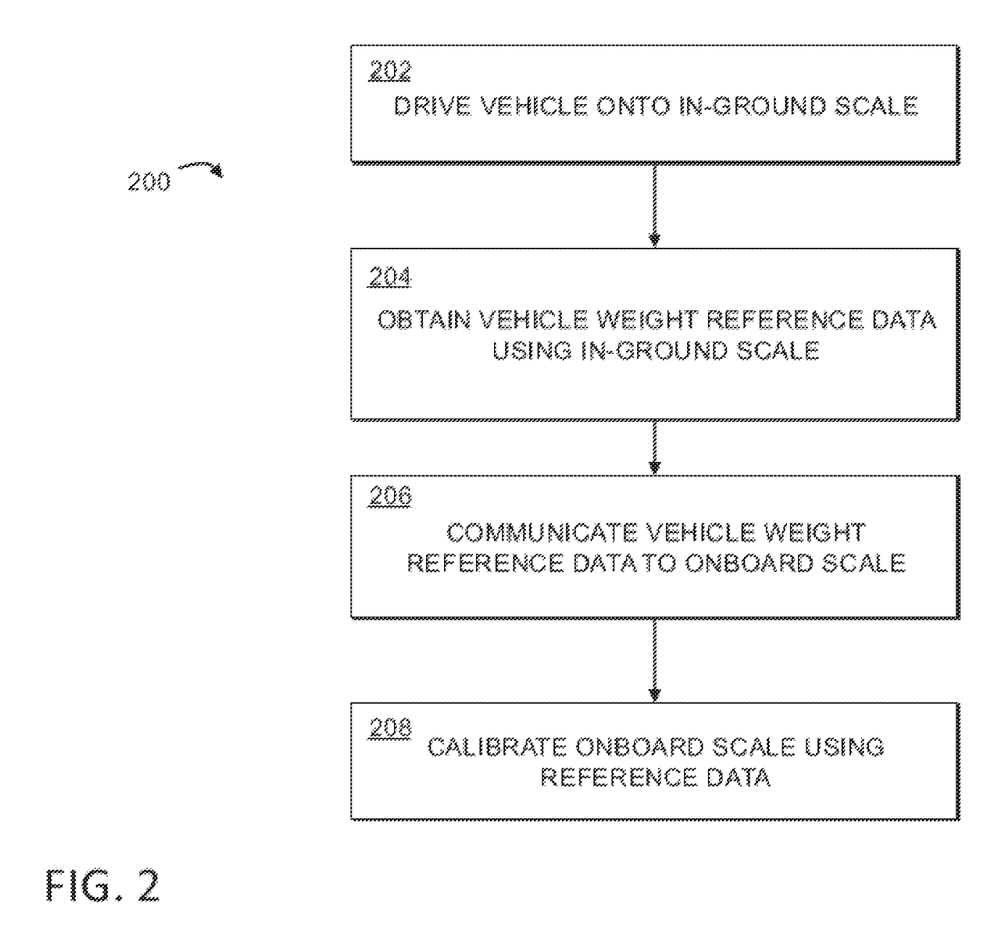
FIG. 2 is a flow chart depicting steps of an illustrative method for calibrating an onboard weight scale in accordance with aspects of the present disclosure.

This section describes a method for automatically calibrating an onboard scale using an in-ground scale and a data exchange system; see FIG. 2. Aspects of automatic scale calibration systems in accordance with aspects of the present disclosure may be utilized in the method steps described below. Where appropriate, reference may be made to previously described components and systems that may be used in carrying out each step. These references are for illustration, and are not intended to limit the possible ways of carrying out any particular step of the method.

FIG. 2 is a flowchart illustrating steps performed in an illustrative method, and may not recite the complete process. FIG. 2 depicts multiple steps of a method, generally indicated at 200, which may be performed in conjunction with automatic scale calibration systems according to aspects of the present disclosure. Although various steps of method 200 are described below and depicted in FIG. 2, the steps need not necessarily all be performed, and in some cases may be performed in a different order than the order shown.

At step 202, a tractor-trailer or other suitable vehicle may be placed onto a reference scale (e.g., an in-ground scale). For example, the vehicle (e.g., vehicle 102) may be driven onto load cells or pads (e.g., portions 118, 120, 122) of an in-ground scale (e.g., scale 104) located at a weighing facility.

At step 204, the weight of the tractor-trailer, or a portion thereof, may be determined by the reference/in-ground scale. Determining the weight may include determining information corresponding to the weight (also referred to as weight information).

At step 206, the weight information determined in step 204 may be communicated to a scale onboard the vehicle (e.g., scale 114 and/or scale 116). Communication transceivers (or transmitters and receivers) associated with the in-ground scale and the onboard scale may link together or form part of a communications network, such that data may be transmitted between the devices wirelessly (see, e.g., transceivers 126, 128, 130). Because this weight data is obtained using a standards-compliant and calibrated in-ground scale, the weight information may be referred to as reference data or reference weight.

In some examples, the onboard scale control system may request the reference data from the in-ground scale system (e.g., a "pull" system). In some examples, the in-ground scale system may send the reference data to the onboard scale without first receiving a request (e.g., a "push" system). In either of these examples, data transfer may be performed automatically upon availability, or upon some sort of user action, such as pressing a data transfer request button, to initiate the communication. In some examples, data transfer may include exchanging unique identifiers for each device involved, such that records may be stored, associated, and/or communicated regarding the identity of the in-ground scale and/or the onboard scale.

At step 208, the reference weight information communicated to the onboard scale in step 206 may be used to calibrate the onboard scale. For example, a request to calibrate may be communicated to a user of the system. The user (e.g., the vehicle driver) may respond by initiating calibration, thereby allowing the system to adjust the onboard scale to correspond to the in-ground scale. In some examples, permission or authorization for automatic calibration may be provided remotely, such as by a dispatcher over a communication network. In some examples, calibration may be automatic, without user intervention. In some examples, calibration may take place after a time delay configured to allow a user to manually abort the process. In some examples, weight data from the in-ground scale may be displayed for informational purposes.

More specifically, in some examples, step 208 may include proceeding with scale calibration only upon receipt of a request to calibrate the scale. In some examples, step 208 may include proceeding with scale calibration in response to receipt of the reference information from step 204. In some examples, the system may be transitionable between a first mode, in which automatic calibration of the scale proceeds in response to receipt of the reference information, and a second mode, in which automatic calibration of the scale proceeds only in response to a user calibration request.

Weights may be taken with the vehicle in multiple different conditions to provide accuracy over a range of weights. For example, in a first loading condition of the vehicle (e.g., empty), the onboard scale may provide a first sensed weight and the in-ground scale may provide a first ground weight. Similarly, in a second loading condition of the vehicle (e.g., fully loaded), the onboard scale may provide a second sensed weight and the in-ground scale a second ground weight. Accordingly, automatically calibrating the scale using the reference information causes the scale to convert the sensed weight to the ground weight over a range comprising the first ground weight and the second ground weight.

Illustrative Data Processing System

Figure 3:
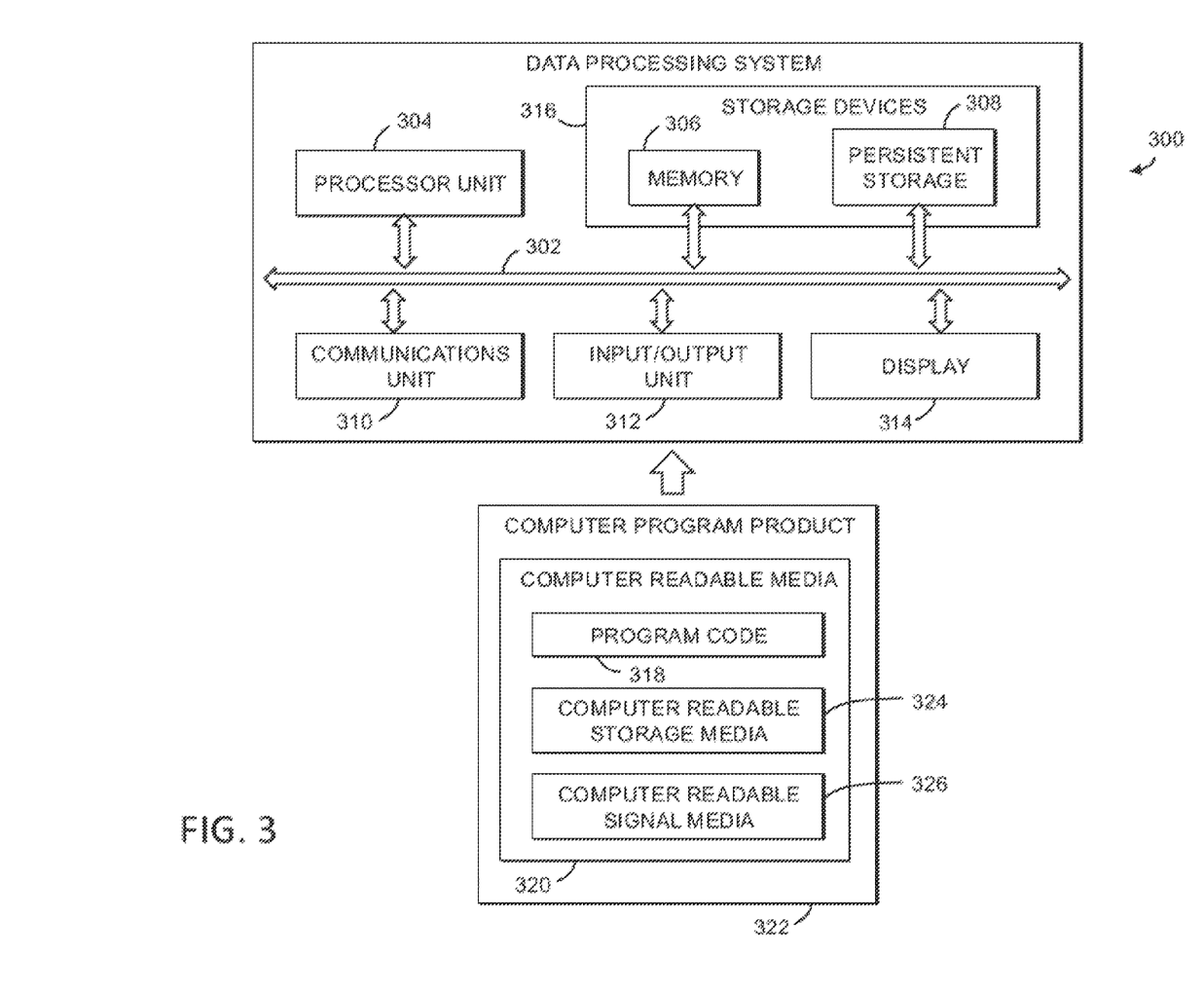
FIG. 3 is a schematic diagram of various components of an illustrative data processing system.

As shown in FIG. 3, this example describes a data processing system 300 (also referred to as a computer) in accordance with aspects of the present disclosure. In this example, data processing system 300 is an illustrative data processing system suitable for implementing aspects of the automatic scale calibration system for onboard scales. More specifically, in some examples, devices that are embodiments of data processing systems (e.g., smartphones, tablets, personal computers) and/or aspects of data processing systems (storage devices, etc.) may include or implement aspects of data exchange system 106, onboard digital scales 114, 116, controller 124, and/or control modules 132A, 132B.

In this illustrative example, data processing system 300 includes communications framework 302. Communications framework 302 provides communications between processor unit 304, memory 306, persistent storage 308, communications unit 310, input/output (I/O) unit 312, and display 314. Memory 306, persistent storage 308, communications unit 310, input/output (I/O) unit 312, and display 314 are examples of resources accessible by processor unit 304 via communications framework 302.

Processor unit 304 serves to run instructions that may be loaded into memory 306. Processor unit 304 may be a number of processors, a multi-processor core, or some other type of processor, depending on the particular implementation. Further, processor unit 304 may be implemented using a number of heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices 316. A storage device is any piece of hardware that is capable of storing information, such as, for example, without limitation, data, program code in functional form, and other suitable information either on a temporary basis or a permanent basis.

Storage devices 316 also may be referred to as computer-readable storage devices in these examples. Memory 306, in these examples, may be, for example, a random access memory or any other suitable volatile or non-volatile storage device. Persistent storage 308 may take various forms, depending on the particular implementation.

For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output (I/O) unit 312 allows for input and output of data with other devices that may be connected to data processing system 300. For example, input/output (I/O) unit 312 may provide a connection for user input through a keyboard, a mouse, and/or some other suitable input device. Further, input/output (I/O) unit 312 may send output to a printer. Display 314 provides a mechanism to display information to a user.

Instructions for the operating system, applications, and/or programs may be located in storage devices 316, which are in communication with processor unit 304 through communications framework 302. In these illustrative examples, the instructions are in a functional form on persistent storage 308. These instructions may be loaded into memory 306 for execution by processor unit 304. The processes of the different embodiments may be performed by processor unit 304 using computer-implemented instructions, which may be located in a memory, such as memory 306.

These instructions are referred to as program instructions, program code, computer usable program code, or computer-readable program code that may be read and executed by a processor in processor unit 304. The program code in the different embodiments may be embodied on different physical or computer-readable storage media, such as memory 306 or persistent storage 308.

Program code 318 is located in a functional form on computer-readable media 320 that is selectively removable and may be loaded onto or transferred to data processing system 300 for execution by processor unit 304. Program code 318 and computer-readable media 320 form computer program product 322 in these examples. In one example, computer-readable media 320 may be computer-readable storage media 324 or computer-readable signal media 326.

Computer-readable storage media 324 may include, for example, an optical or magnetic disk that is inserted or placed into a drive or other device that is part of persistent storage 308 for transfer onto a storage device, such as a hard drive, that is part of persistent storage 308. Computer-readable storage media 324 also may take the form of a persistent storage, such as a hard drive, a thumb drive, or a flash memory, that is connected to data processing system 300. In some instances, computer-readable storage media 324 may not be removable from data processing system 300.

In these examples, computer-readable storage media 324 is a physical or tangible storage device used to store program code 318 rather than a medium that propagates or transmits program code 318. Computer-readable storage media 324 is also referred to as a computer-readable tangible storage device or a computer-readable physical storage device. In other words, computer-readable storage media 324 is a media that can be touched by a person.

Alternatively, program code 318 may be transferred to data processing system 300 using computer-readable signal media 326. Computer-readable signal media 326 may be, for example, a propagated data signal containing program code 318. For example, computer-readable signal media 326 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 318 may be downloaded over a network to persistent storage 308 from another device or data processing system through computer-readable signal media 326 for use within data processing system 300. For instance, program code stored in a computer-readable storage medium in a server data processing system may be downloaded over a network from the server to data processing system 300. The data processing system providing program code 318 may be a server computer, a client computer, or some other device capable of storing and transmitting program code 318.

The different components illustrated for data processing system 300 are not meant to provide architectural limitations to the manner in which different embodiments may be implemented. The different illustrative embodiments may be implemented in a data processing system including components in addition to and/or in place of those illustrated for data processing system 300. Other components shown in FIG. 3 can be varied from the illustrative examples shown. The different embodiments may be implemented using any hardware device or system capable of running program code. As one example, data processing system 300 may include organic components integrated with inorganic components and/or may be comprised entirely of organic components excluding a human being. For example, a storage device may be comprised of an organic semiconductor.

In another illustrative example, processor unit 304 may take the form of a hardware unit that has circuits that are manufactured or configured for a particular use. This type of hardware may perform operations without needing program code to be loaded into a memory from a storage device to be configured to perform the operations.

For example, when processor unit 304 takes the form of a hardware unit, processor unit 304 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 318 may be omitted, because the processes for the different embodiments are implemented in a hardware unit.

In still another illustrative example, processor unit 304 may be implemented using a combination of processors found in computers and hardware units. Processor unit 304 may have a number of hardware units and a number of processors that are configured to run program code 318. With this depicted example, some of the processes may be implemented in the number of hardware units, while other processes may be implemented in the number of processors.

In another example, a bus system may be used to implement communications framework 302 and may be comprised of one or more buses, such as a system bus or an input/output bus. Of course, the bus system may be implemented using any suitable type of architecture that provides for a transfer of data between different components or devices attached to the bus system.

Additionally, communications unit 310 may include a number of devices that transmit data, receive data, or both transmit and receive data. Communications unit 310 may be, for example, a modem or a network adapter, two network adapters, or some combination thereof. Further, a memory may be, for example, memory 306, or a cache, such as that found in an interface and memory controller hub that may be present in communications framework 302.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

Illustrative Computer Network

Figure 4:
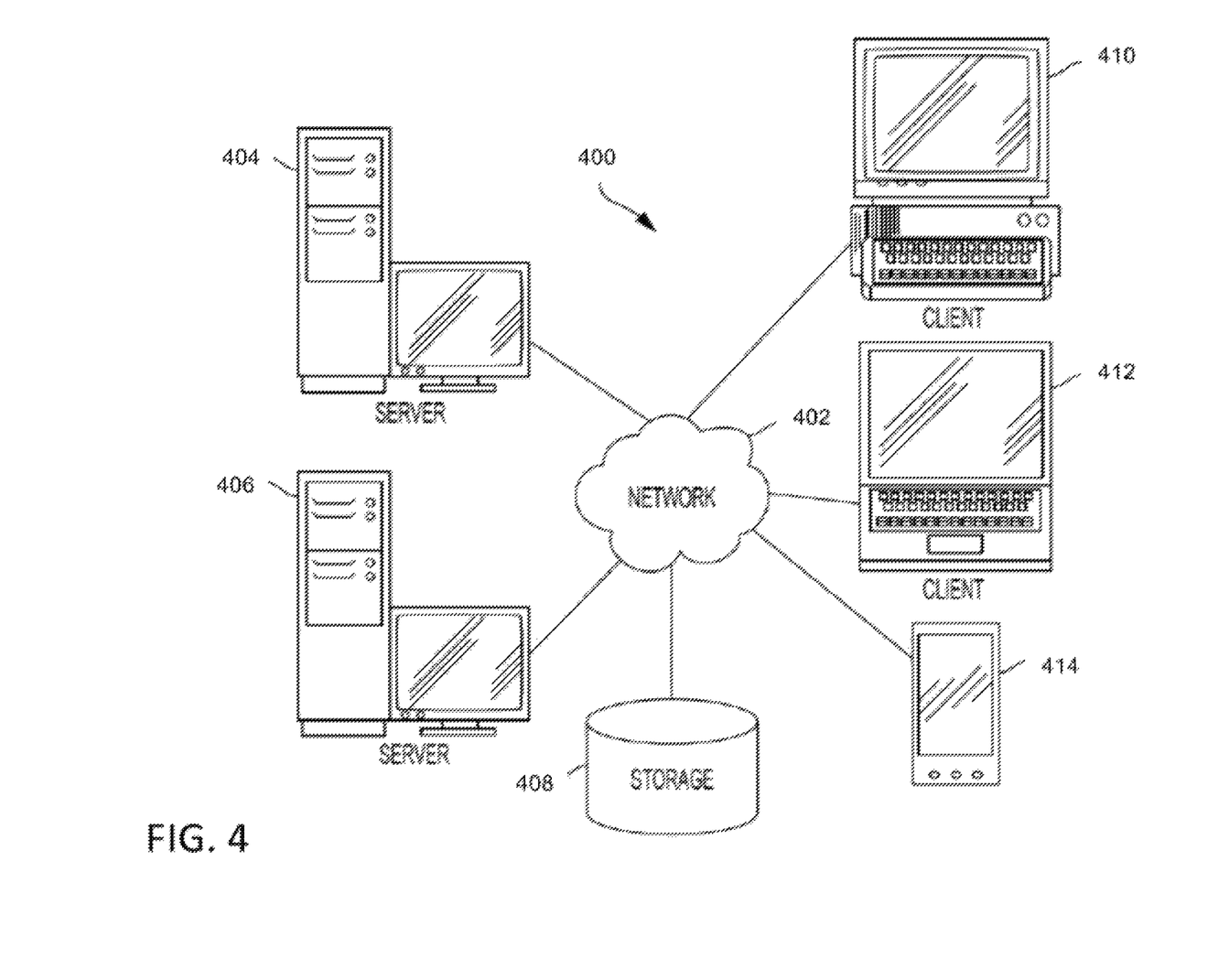
FIG. 4 is a schematic representation of an illustrative computer network system.

As shown in FIG. 4, this example describes a general network data processing system 400, interchangeably termed a network, a computer network, a network system, or a distributed network, aspects of which may be included in one or more illustrative embodiments of an automatic scale calibration system. For example, aspects of data exchange system 106 may communicate over and/or be part of a computer network. It should be appreciated that FIG. 4 is provided as an illustration of one implementation and is not intended to imply any limitation with regard to environments in which different embodiments may be implemented. Many modifications to the depicted environment may be made.

Network data processing system 400 is a network of computers, each of which is an example of data processing system 300, and other components. Network data processing system 400 may include network 402, which is a medium configured to provide communications links between various devices and computers connected together within network data processing system 400. Network 402 may include connections such as wired or wireless communication links, fiber optic cables, and/or any other suitable medium for transmitting and/or communicating data between network devices, or any combination thereof.

In the depicted example, a first network device 404 and a second network device 406 connect to network 402, as does an electronic storage device 408. Network devices 404 and 406 are each examples of data processing system 300, described above. In the depicted example, devices 404 and 406 are shown as server computers. However, network devices may include, without limitation, one or more personal computers, mobile computing devices such as personal digital assistants (PDAs), tablets, and smart phones, handheld gaming devices, wearable devices, tablet computers, routers, switches, voice gates, servers, electronic storage devices, imaging devices, and/or other networked-enabled tools that may perform a mechanical or other function. These network devices may be interconnected through wired, wireless, optical, and other appropriate communication links.

In addition, client electronic devices, such as a client computer 410, a client laptop or tablet 412, and/or a client smart device 414, may connect to network 402. Each of these devices is an example of data processing system 300, described above regarding FIG. 3. Client electronic devices 410, 412, and 414 may include, for example, one or more personal computers, network computers, and/or mobile computing devices such as personal digital assistants (PDAs), smart phones, handheld gaming devices, wearable devices, and/or tablet computers, and the like. In the depicted example, server 404 provides information, such as boot files, operating system images, and applications to one or more of client electronic devices 410, 412, and 414. Client electronic devices 410, 412, and 414 may be referred to as "clients" with respect to a server such as server computer 404. Network data processing system 400 may include more or fewer servers and clients or no servers or clients, as well as other devices not shown.

Client smart device 414 may include any suitable portable electronic device capable of wireless communications and execution of software, such as a smartphone or a tablet. Generally speaking, the term "smartphone" may describe any suitable portable electronic device having more advanced computing ability and network connectivity than a typical mobile phone. In addition to making phone calls (e.g., over a cellular network), smartphones may be capable of sending and receiving emails, texts, and multimedia messages, accessing the Internet, and/or functioning as a web browser. Smartdevices (e.g., smartphones) may also include features of other known electronic devices, such as a media player, personal digital assistant, digital camera, video camera, and/or global positioning system. Smartdevices (e.g., smartphones) may be capable of connecting with other smartdevices, computers, or electronic devices wirelessly, such as through near field communications (NFC), BLUETOOTH®, WiFi, or mobile broadband networks. Wireless connectively may be established among smartdevices, smartphones, computers, and other devices to form a mobile network where information can be exchanged.

Program code located in system 400 may be stored in or on a computer recordable storage medium, such as persistent storage 308 in Example 1, and may be downloaded to a data processing system or other device for use. For example, program code may be stored on a computer recordable storage medium on server computer 404 and downloaded for use to client 410 over network 402 for use on client 410.

Network data processing system 400 may be implemented as one or more of a number of different types of networks. For example, system 400 may include an intranet, a local area network (LAN), a wide area network (WAN), or a personal area network (PAN). In some examples, network data processing system 400 includes the Internet, with network 402 representing a worldwide collection of networks and gateways that use the transmission control protocol/Internet protocol (TCP/IP) suite of protocols to communicate with one another. At the heart of the Internet is a backbone of high-speed data communication lines between major nodes or host computers. Thousands of commercial, governmental, educational and other computer systems may be utilized to route data and messages. FIG. 4 is intended as an example, and not as an architectural limitation for any illustrative embodiments.

Additional Examples and Illustrative Combinations

This section describes additional aspects and features of automatic scale calibration systems and related methods, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. An automatic calibration system for an onboard vehicle scale, the system comprising:

a scale coupled to a vehicle, such that the scale travels with the vehicle, the scale configured to determine a sensed weight of a portion of the vehicle;

a wireless transceiver onboard the vehicle and in communication with the scale; and an onboard controller in communication with the scale and the wireless transceiver, the controller including a processor, a memory, and a plurality of instructions stored in the memory and executable by the processor to:

receive the sensed weight of the portion of the vehicle from the scale;

receive reference information from an offboard source via the wireless transceiver, wherein the reference information corresponds to a ground weight of the portion of the vehicle; and automatically calibrate the scale using the reference information, such that the scale is configured to convert the sensed weight to the ground weight.

A1. The system of A0, wherein the offboard source comprises an in-ground scale.

A2. The system of A1, wherein the in-ground scale comprises a plurality of scale pads, and the reference information corresponds to the ground weight of the portion of the vehicle as detected by one of the scale pads.

A3. The system of A0, wherein the sensed weight corresponds to a drive axle of the vehicle.

A4. The system of A0, wherein the scale is coupled to an axle of the vehicle.

A5. The system of A0, wherein the scale is coupled to a suspension system of the vehicle.

A6. The system of A0, wherein the plurality of instructions are further executable by the processor to proceed with scale calibration only upon receipt of a request to calibrate the scale.

A7. The system of A0, wherein the plurality of instructions are further executable by the processor to automatically proceed with scale calibration in response to receipt of the reference information.

A8. The system of A7, wherein scale calibration automatically proceeds after a selected time delay.

A9. The system of A0, wherein the controller is transitionable between a first mode, in which automatic calibration of the scale proceeds in response to receipt of the reference information, and a second mode, in which automatic calibration of the scale proceeds only in response to a user calibration request.

A10. The system of A0, wherein the sensed weight comprises a first sensed weight at a first loading condition of the vehicle and a second sensed weight at a second loading condition of the vehicle; wherein the reference information corresponds to a first ground weight at the first loading condition and a second ground weight at the second loading condition; and wherein automatically calibrating the scale using the reference information causes the scale to convert the sensed weight to the ground weight over a range comprising the first ground weight and the second ground weight.

B0. A method implemented in a data processing system for calibrating an onboard vehicle scale, the method comprising:

receiving, into a data processing system, a sensed weight of a portion of a vehicle from a first scale;

receiving, into the data processing system, reference information from an offboard source via a wireless transceiver, wherein the reference information corresponds to a ground weight of the portion of the vehicle; and automatically calibrating the scale with respect to the reference information, using a processor of the data processing system, such that the scale is configured to convert the sensed weight to the ground weight.

B1. The method of B0, wherein the offboard source comprises a ground-based scale and the vehicle is currently disposed on the ground-based scale.

B2. The method of B1, wherein the ground-based scale comprises a plurality of scale pads, and the reference information corresponds to the ground weight of the portion of the vehicle as detected by one of the scale pads.

B3. The method of B0, wherein the sensed weight corresponds to a drive axle of the vehicle.

B4. The method of B0, wherein the scale is coupled to an axle of the vehicle.

B5. The method of B0, wherein the scale is coupled to a suspension method of the vehicle.

B6. The method of B0, wherein automatically calibrating the scale only occurs upon receipt of a request, by the processor, to calibrate the scale.

B7. The method of B0, wherein automatically calibrating the scale is performed by the processor in response to receipt of the reference information.

B8. The method of B7, wherein scale calibration automatically proceeds after a selected time delay.

B9. The method of B0, further comprising:

transitioning the data processing system between a first mode, in which automatic calibration of the scale proceeds in response to receipt of the reference information, and a second mode, in which automatic calibration of the scale proceeds only in response to a user calibration request.

B10. The method of B0, wherein the sensed weight comprises a first sensed weight at a first loading condition of the vehicle and a second sensed weight at a second loading condition of the vehicle; wherein the reference information corresponds to a first ground weight at the first loading condition and a second ground weight at the second loading condition; and wherein automatically calibrating the scale using the reference information causes the scale to convert the sensed weight to the ground weight over a range comprising the first ground weight and the second ground weight.

C0. A method for calibrating an onboard vehicle scale, the method comprising:

disposing a vehicle upon a reference (e.g., an in-ground) scale;

determining reference weight information corresponding to a weight of at least a portion of the vehicle using the reference scale;

automatically and wirelessly communicating the reference weight information to an onboard scale coupled to the vehicle; and automatically calibrating the onboard scale using the reference weight information.

C1. The method of C0, wherein automatically calibrating the onboard scale is performed only upon receipt of a request to calibrate the scale.

C2. The method of C0, further comprising:

requesting the reference weight information from the in-ground scale using a control system of the onboard scale.

C3. The method of C0, wherein communicating reference weight information to the onboard scale includes transmitting a unique identifier of the in-ground scale to a controller of the onboard scale.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method for calibrating an onboard vehicle scale, the method comprising:
    disposing a vehicle upon a reference scale;
    determining reference weight information corresponding to a weight of at least a portion of the vehicle as measured by the reference scale;
    automatically and wirelessly communicating, via a wireless transceiver unit of the reference scale, the reference weight information to an onboard scale coupled to the vehicle; and
    automatically calibrating the onboard scale using the reference weight information such that the weight of the at least a portion of the vehicle corresponds to a sensed weight of the at least a portion of the vehicle as measured by the onboard scale.

2. The method of claim 1, wherein automatically calibrating the onboard scale is performed only upon receipt of a request to calibrate the scale.

3. The method of claim 1, further comprising:
    wirelessly requesting the reference weight information from the reference scale using a control system of the onboard scale.

4. The method of claim 1, wherein communicating reference weight information to the onboard scale includes transmitting a unique identifier of the reference scale to a controller of the onboard scale.

5. The method of claim 1, wherein automatically and wirelessly communicating the reference weight information to an onboard scale coupled to the vehicle is performed without first receiving a request.

6. The method of claim 1, wherein automatically calibrating the onboard scale using the reference weight information is performed without user intervention.

* * * * *